US012562122B2

(12) United States Patent
Seong

(10) Patent No.: US 12,562,122 B2
(45) Date of Patent: Feb. 24, 2026

(54) PIXEL CIRCUIT AND DISPLAY DEVICE INCLUDING THE SAME

(71) Applicant: LG Display Co., Ltd., Seoul (KR)

(72) Inventor: Narkhyeon Seong, Anyang-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/985,975

(22) Filed: Mar. 10, 2025

(65) Prior Publication Data

US 2025/0246144 A1 Jul. 31, 2025

(51) Int. Cl.
*G09G 3/3233* (2016.01)

(52) U.S. Cl.
CPC ... *G09G 3/3233* (2013.01); *G09G 2300/0819* (2013.01); *G09G 2300/0852* (2013.01); *G09G 2300/0861* (2013.01); *G09G 2310/08* (2013.01); *G09G 2320/0238* (2013.01); *G09G 2320/0247* (2013.01)

(58) Field of Classification Search
None
See application file for complete search history.

(56) References Cited

U.S. PATENT DOCUMENTS

2023/0197003 A1* 6/2023 Her .................... G09G 3/3233 345/690
2024/0077759 A1* 3/2024 Lee .................. G02F 1/133308

FOREIGN PATENT DOCUMENTS

KR 10-2023-0091553 A 6/2023

* cited by examiner

*Primary Examiner* — Stephen T. Reed
(74) *Attorney, Agent, or Firm* — Morgan, Lewis & Bockius LLP

(57) ABSTRACT

A pixel circuit includes a first transistor including a 1-1-th electrode connected to a first node, a 1-2-th electrode connected to a second node, a 1-1-th dual gate electrode connected to a third node, and a 1-2-th dual gate electrode connected to a fourth node. The pixel circuit further includes a light emitting diode including an anode electrode connected to the second node and a cathode electrode receiving a low potential driving voltage and emitting light according to a driving current transmitted from the first transistor in an emission period. The pixel circuit further includes: a first capacitor connected between the second node and the third node, and a compensation circuit which is connected to the first transistor to sample a threshold voltage of the first transistor to generate the driving current in which the threshold voltage is compensated, in a sensing period before the emission period.

20 Claims, 9 Drawing Sheets

PIXEL CIRCUIT AND DISPLAY DEVICE INCLUDING THE SAME

CROSS-REFERENCE TO RELATED APPLICATIONS

This application claims the benefit of and priority to Korean Patent Application No. 10-2024-0015207 filed on Jan. 31, 2024, in the Korean Intellectual Property Office, the entire contents of which are incorporated herein by reference for all purposes.

BACKGROUND

1. Technical Field

The present disclosure relates to pixel circuits and display devices, and particularly to, for example, without limitation, a pixel circuit which is capable of compensating for a threshold voltage of a driving transistor and a display device including the same.

2. Description of the Related Art

As it enters an information era, a display field which visually expresses electrical information signals has been rapidly developed, and in response to this, various display devices having excellent performances such as thin-thickness, light weight, and low power consumption have been developed. Examples of such a display device include a liquid crystal display device (LCD), an organic light emitting display device (OLED), and the like.

Such a display device may include a display panel in which pixel arrays for displaying images are disposed and a driving circuit, such as a data driver, a gate driver, and a timing controller. The data driver supplies a data signal to data lines disposed in the display panel, the gate driver sequentially supplies a gate signal to gate lines disposed in the active area, and the timing controller controls the data driver and the gate driver.

The description of the related art should not be assumed to be prior art merely because it is mentioned in or associated with this section. The description of the related art includes information that describes one or more aspects of the subject technology, and the description in this section does not limit the invention.

SUMMARY

An aspect to be achieved by an example embodiment of the present disclosure is to provide a pixel circuit which compensates for a threshold voltage Vth of a driving transistor regardless of a polarity and a display device including the same.

Another aspect to be achieved by another example embodiment of the present disclosure is to provide a pixel circuit in which a capacitor coupling effect does not occur and a display device including the same.

Aspects of the present disclosure are not limited to the above-mentioned aspects, and other aspects, which are not mentioned above, can be clearly understood by those skilled in the art from the following descriptions.

In order to achieve one or more aspects and advantages of the present disclosure, according to an aspect of the present disclosure, a pixel circuit includes a first transistor including a 1-1-th electrode connected to a first node, a 1-2-th electrode connected to a second node, a 1-1-th dual gate electrode connected to a third node, and a 1-2-th dual gate electrode connected to a fourth node; a light emitting diode which includes an anode electrode connected to the second node and a cathode electrode which is configured to receive a low potential driving voltage, and emits light according to a driving current transmitted from the first transistor in an emission period; a first capacitor connected between a second node and a third node; and a compensation circuit which is connected to the first transistor to sample a threshold voltage of the first transistor to generate the driving current in which the threshold voltage is compensated, in a sensing period before the emission period. At this time, the compensation circuit includes a second capacitor connected between a second node and a fourth node; a second transistor including a 2-1-th electrode connected to the fourth node, a 2-2-th electrode connected to the first node, and a gate electrode which is configured to receive a first scan signal; and a third transistor including a 3-1-th electrode which is configured to receive a high potential driving voltage, a 3-2-th electrode connected to the fourth node, and a gate electrode which is configured to receive a second scan signal.

According to one or more aspects of the present disclosure, a display device includes: a gate driver which supplies a first scan signal, a second scan signal, a third scan signal, and an EM signal to gate lines; a power supply unit which generates and outputs a high potential driving voltage, a low potential driving voltage, a reference voltage, and an initialization voltage to power lines; and a plurality of pixels which is disposed along a matrix shape defined by intersecting the data lines and the gate lines. At this time, each of the plurality of pixels includes a first transistor including a 1-1-th electrode connected to a first node, a 1-2-th electrode connected to a second node, a 1-1-th dual gate electrode connected to a third node, and a 1-2-th dual gate electrode connected to a fourth node; a light emitting diode which includes an anode electrode connected to the second node and a cathode electrode which is configured to receive a low potential driving voltage, and emits light according to a driving current transmitted from the first transistor in an emission period; a first capacitor connected between a second node and a third node; and a compensation circuit which is connected to the first transistor to sample a threshold voltage of the first transistor to generate the driving current in which the threshold voltage is compensated, in a sensing period before the emission period. At this time, the compensation circuit includes a second capacitor connected between a second node and a fourth node; a second transistor including a 2-1-th electrode connected to the fourth node, a 2-2-th electrode connected to the first node, and a gate electrode which is configured to receive a first scan signal; and a third transistor including a 3-1-th electrode which is configured to receive a high potential driving voltage, a 3-2-th electrode connected to the fourth node, and a gate electrode which is configured to receive a second scan signal.

Other detailed matters of the example embodiments are included in the detailed description and the drawings.

According to an example embodiment of the present disclosure, all advantages of compensation circuits of a diode connection method and a source follower method may be implemented by utilizing a dual gate.

According to another example embodiment of the present disclosure, a sampling period and a writing period are temporally divided to ensure a compensation time of a threshold voltage Vth and improve a compensation capacity during high speed operation.

According to still another example embodiment of the present disclosure, a threshold voltage Vth may be compensated regardless of a polarity of the threshold voltage Vth.

The effects of the present disclosure are not limited to the aforementioned effects, and other effects, which are not mentioned above, will be apparently understood to a person having ordinary skill in the art from the following description.

Additional features, advantages, and aspects of the present disclosure are set forth in part in the description that follows and in part will become apparent from the present disclosure or may be learned by practice of the inventive concepts provided herein. Other features, advantages, and aspects of the present disclosure may be realized and attained by the descriptions provided in the present disclosure, or derivable therefrom, and the claims hereof as well as the drawings. It is intended that all such features, advantages, and aspects be included within this description, be within the scope of the present disclosure, and be protected by the following claims. Nothing in this section should be taken as a limitation on those claims. Further aspects and advantages are discussed below in conjunction with embodiments of the present disclosure.

It is to be understood that both the foregoing description and the following description of the present disclosure are examples, and are intended to provide further explanation of the disclosure as claimed.

BRIEF DESCRIPTION OF DRAWINGS

The accompanying drawings, which are included to provide a further understanding of the present disclosure, are incorporated in and constitute a part of this present disclosure, illustrate aspects and embodiments of the present disclosure, and together with the description serve to explain principles and examples of the disclosure. In the drawings.

Figure 1:
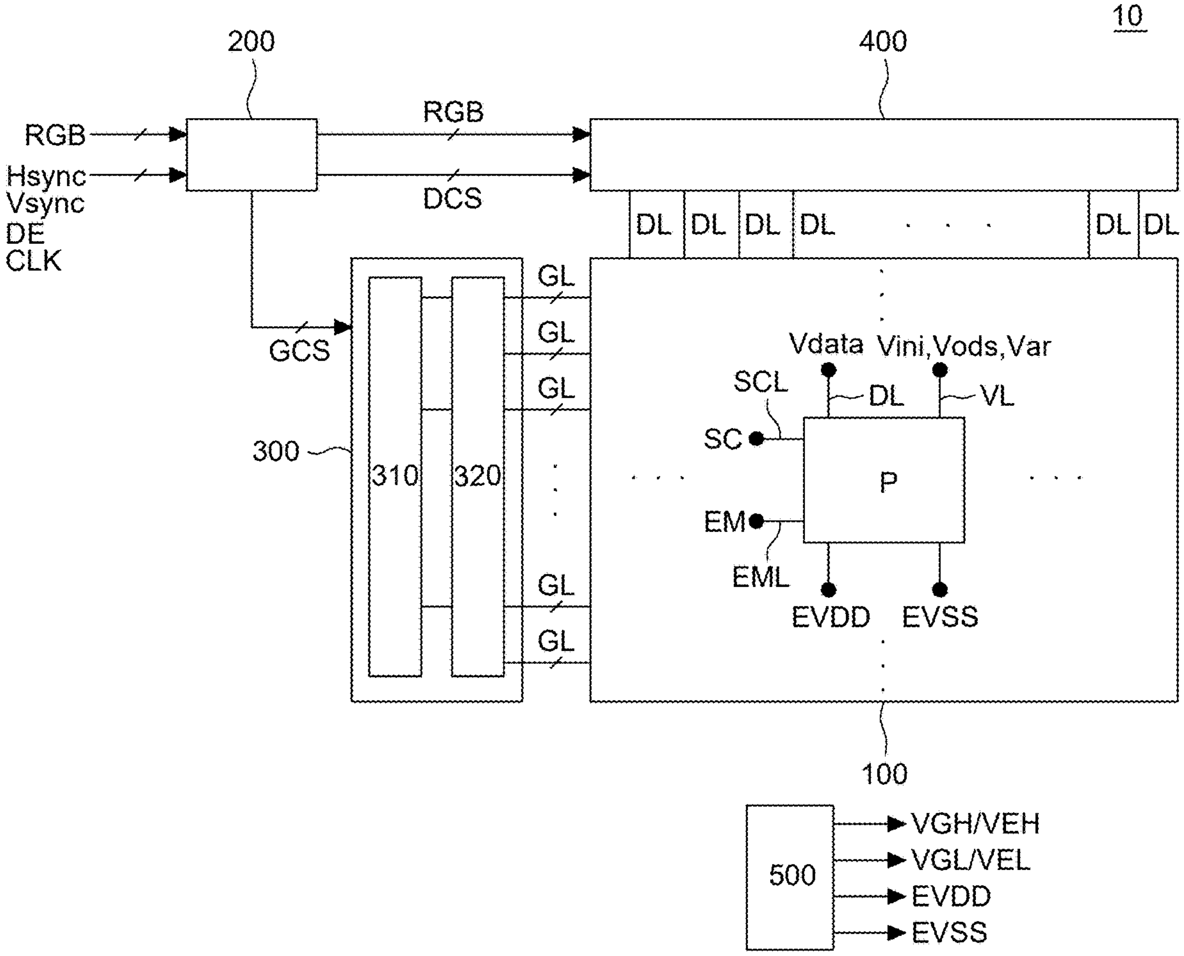
FIG. 1 is a block diagram schematically illustrating a display device according to an example embodiment of the present disclosure.

Throughout the drawings and the detailed description, unless otherwise described, the same drawing reference numerals should be understood to refer to the same elements, features, and structures. The sizes, lengths, and thicknesses of layers, regions and elements, and depiction thereof may be exaggerated for clarity, illustration, and/or convenience.

DETAILED DESCRIPTION

Advantages and characteristics of the present disclosure and a method of achieving the advantages and characteristics will be clear by referring to example embodiments described below in detail together with the accompanying drawings. However, the present disclosure is not limited to the example embodiments disclosed herein but will be implemented in various forms. The example embodiments are provided by way of example only so that those skilled in the art can fully understand the disclosures of the present disclosure and the scope of the present disclosure.

The shapes, sizes, ratios, angles, numbers, and the like illustrated in the accompanying drawings for describing the example embodiments of the present disclosure are merely examples, and the present disclosure is not limited thereto. Like reference numerals generally denote like elements throughout the specification.

Further, in the following description of the present disclosure, a detailed explanation of known related technologies may be omitted to avoid unnecessarily obscuring the subject matter of the present disclosure.

The terms such as "including," "having," and "consist of" used herein are generally intended to allow other components to be added unless the terms are used with the term "only". Any references to singular may include plural unless expressly stated otherwise.

Components are interpreted to include an ordinary error range even if not expressly stated.

When the position relation between two parts is described using the terms such as "on", "above", "below", and "next", one or more parts may be positioned between the two parts unless the terms are used with the term "immediately" or "directly" is not used.

When an element or layer is referred to as being "on" another element or layer, it may be directly on the other element or layer, or intervening elements or layers may be present therebetween. When a component is "linked", "coupled", or "connected" to another component, the component may be directly linked or connected to the other component. However, unless specifically stated otherwise, it should be understood that a third component may be interposed between the components which may be indirectly linked or connected.

Although the terms "first", "second", and the like are used for describing various components, these components are not confined by these terms. These terms are merely used for distinguishing one component from the other components. Therefore, a first component to be mentioned below may be a second component in a technical concept of the present disclosure.

Like reference numerals generally denote like elements throughout the specification.

A size and a thickness of each component illustrated in the drawings are illustrated for convenience of explanation, and are not limited to the size and the thickness of the component illustrated in embodiments of the present disclosure.

The features of various embodiments of the present disclosure can be partially or entirely coupled to or combined with each other and can be interlocked and operated in technically various ways, and respective embodiments can be carried out independently of or in association with each other.

Hereinafter, an example embodiment of the present disclosure will be described in detail with reference to the drawings.

Figure 2:
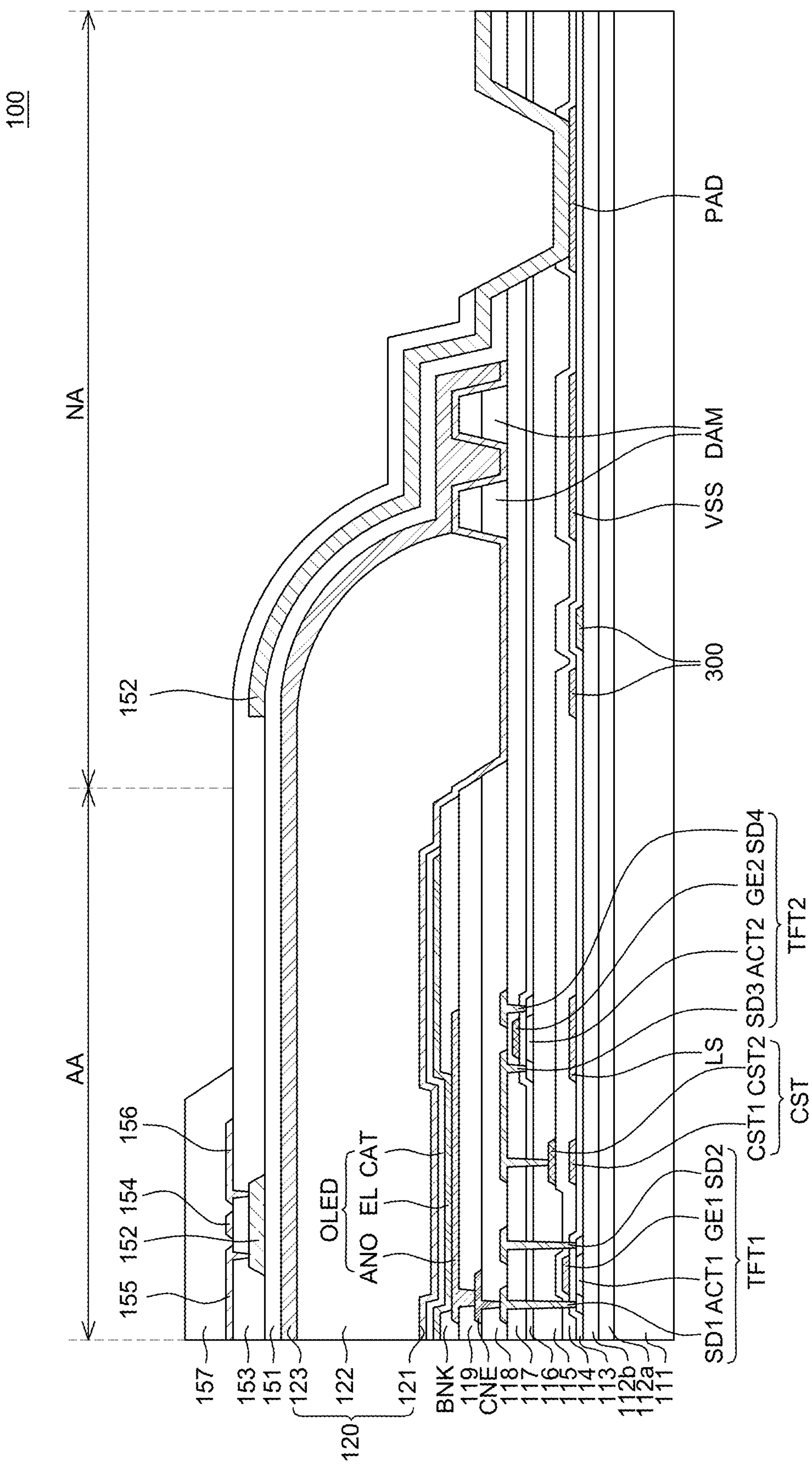
FIG. 2 is a cross-sectional view of a display device according to an example embodiment of the present disclosure.

FIG. 1 is a block diagram schematically illustrating a display device according to an example embodiment of the present disclosure. FIG. 2 is a cross-sectional view of a display device according to an example embodiment of the present disclosure.

Referring to FIG. 1, the display device 10 includes a display panel 100 including a plurality of pixels P, a controller 200, a gate driver 300 which supplies a gate signal to each of the plurality of pixels P, a data driver 400 which supplies a data signal to each of the plurality of pixels P, and a power supply unit 500. The power supply unit 500 supplies a power required for driving to each of the plurality of pixels P.

Referring to FIGS. 1 and 2, the display panel 100 includes an active area AA in which the pixel P is located and a non-active area NA which is disposed so as to enclose the active area AA and includes the gate driver 300 and the data driver 400.

In the display panel 100, the plurality of gate lines GL and the plurality of data lines DL intersect each other and the plurality of pixels P is connected to the gate lines GL and the data line DL, respectively. Specifically, one pixel P is supplied with a gate signal from the gate driver 300 through the gate line GL, is supplied with a data signal from the data driver 400 through the data line DL, and is supplied with a high potential driving voltage EVDD and a low potential driving voltage EVSS from the power supply unit 500.

Here, the gate line GL supplies a scan signal SC and an emission control signal EM and the data line DL supplies a data voltage Vdata. Further, according to various example embodiments, the gate line GL may include a plurality of gate lines SCL which supplies a scan signal SC and an emission control signal line EML which supplies the emission control signal EM. Further, the plurality of pixels P further includes a power line VL to be supplied with a bias voltage Vobs and initialization voltages Var and Vini.

Further, each pixel P includes a light emitting diode EL and a pixel circuit which controls the operation of the light emitting diode EL, as illustrated in FIG. 2. Here, the light emitting diode EL is configured by an anode electrode 171, a cathode electrode 173, and an emission layer 172 between the anode electrode 171 and the cathode electrode 173.

The pixel circuit includes a plurality of switching elements, a driving element, and a capacitor. Here, the switching element and the driving element may be configured by thin film transistors. In the pixel circuit, the driving element controls an amount of currents to be supplied to the light emitting diode EL in accordance with the data voltage to adjust an emission amount of the light emitting diode EL. Further, the plurality of switching elements receives a scan signal SC supplied through the plurality of gate lines SCL and an emission control signal EM supplied through the emission control line EML to operate the pixel circuit.

The display panel 100 may be implemented as a non-transmissive display panel or a transmissive display panel. For example, the transmissive display panel may be applied to a transparent display device in which an image is displayed on a screen and real objects in the background are visible.

The display panel 100 may be manufactured as a flexible display panel. For example, the flexible display panel may be implemented by an OLED panel which uses a plastic substrate.

Each pixel P may be divided into a red pixel, a green pixel, and a blue pixel to implement colors. Each pixel P may further include a white pixel. Each pixel P includes a pixel circuit.

Touch sensors may be disposed on the display panel 100. The touch input is sensed using separate touch sensors or sensed by pixels P. The touch sensors may be disposed on the screen of the display panel in an on-cell type or an add-on type or implemented as in-cell type touch sensors to be embedded in the display panel 100.

The controller 200 processes image data RGB input from the outside to be suitable for a size and a resolution of the display panel 100 to supply the processed image data to the data driver 400. The controller 200 generates a gate control signal GCS and a data control signal DCS using synchronization signals input from the outside, for example, a dot clock signal CLK, a data enable signal DE, a horizontal synchronization signal Hsync, and a vertical synchronization signal Vsync. The controller 200 supplies the gate control signal GCS and the data control signal DCS to the gate driver 300 and the data driver 400, respectively, to control the gate driver 300 and the data driver 400.

The controller 200 may be configured to be coupled with various processors, such as a microprocessor, a mobile processor, or an application processor, depending on a device to be mounted.

The controller 200 multiples an input frame frequency by i and may control an operating timing of a display panel driver with a frame frequency of an input frame frequency×i (i is a positive integer larger than 0) Hz. The input frame frequency may be 60 Hz in a national television standards committee (NTSC) standard and is 50 Hz in a phase-alternating line (PAL) standard.

The controller 200 generates a signal to allow the pixel P to be driven at various refresh rates. The controller 200 may generate signals associated with the driving to allow the pixel P to be driven in a variable refresh rate (VRR) mode or to be switchable between a first refresh rate and a second refresh rate. For example, the controller 200 may drive the pixel P at various refresh rates by simply changing a rate of a clock signal, or generating a synchronization signal to generate a horizontal blank or a vertical blank, or driving the gate driver 300 in a mask manner.

The controller 200 generates a gate control signal GCS for controlling an operating timing of the gate driver 300 and a data control signal DSC for controlling an operating timing of the data driver 400, based on timing signals Vsync, Hsync, and DE received from the host system. A host system may be any one of a television (TV) system, a set top box, a navigation system, a personal computer (PC), a home theater system, a mobile device, a wearable device, and a vehicle system.

The controller 200 controls the operating timing of the display panel driver to synchronize the gate driver 300 and the data driver 400.

A voltage level of the gate control signal GCS output from the controller 200 is converted into gate-on voltages VGL and VEL and gate-off voltages VGH and VEH through a level shifter to be supplied to the gate driver 300. The level shifter converts a low level voltage of the gate control signal GCS into the gate low voltage VGL and converts a high level voltage of the gate control signal GCS into a gate high voltage VGH. The gate control signal GCS includes a start pulse and a shift clock.

The gate driver 300 supplies the scan signals SC to the gate lines GL in accordance with the gate control signal GCS supplied from the controller 200. The gate driver 300 may be disposed at one side or both sides of the display panel 100 in a gate in panel (GIP) manner.

The gate driver 300 sequentially outputs the gate signals to the plurality of gate lines GL under the control of the controller 200. The gate driver 300 shifts the gate signal using a shift register to sequentially supply the signals to the gate lines GL.

The gate signal may include a scan signal SC and an emission control signal EM.

The scan signal SC includes a scan pulse swinging between the gate-on voltage VGL and the gate-off voltage VGH. The scan pulse is synchronized with the data voltage Vdata to select the pixels P of a line in which the data is written.

The emission control signal EM may include an emission control signal pulse swinging between the gate-on voltage VGL and the gate-off voltage VGH. The emission control signal EM defines an emission time of the pixels P.

The gate driver 300 may include an emission control signal driver 310 and at least one or more scan drivers 320.

The emission control signal driver 310 outputs an emission control signal pulse in response to a start pulse and a shift clock from the controller 200 and sequentially shifts the emission control signal pulse in accordance with a shift clock.

At least one or more scan drivers 320 output the scan pulse in response to a start pulse and a shift clock from the controller 200 and shift a scan pulse in accordance with the shift clock timing.

The data driver 400 converts image data RGB into a data voltage Vdata in accordance with the data control signal DCS supplied from the controller 200 and supplies the converted data voltage Vdata to the pixel P through the data line DL.

Even though in FIG. 1, it is illustrated that one data driver 400 is disposed at one side of the display panel 100, the number of the data drivers 400 and a placement position thereof are not limited thereto. For example, the data driver 400 is configured by a plurality of integrated circuits (IC) to be disposed to be divided into a plurality of parts at one side of the display panel 100.

The power supply unit 500 generates a DC power required to drive the pixel array of the display panel 100 and the display panel driver using a DC-DC converter. The DC-DC converter may include a charge pump, a regulator, a buck converter, and a boost converter.

The power supply unit 500 receives a DC input voltage applied from the host system to generate a DC voltage, such as a gate-on voltage VGL and VEL, a gate-off voltage VGH and VEH, a high potential driving voltage EVDD, and a low potential driving voltage EVSS. The gate-on voltage VGL and VEL and the gate-off voltage VGH and VEH are supplied to the level shifter and the gate driver 300. The high potential driving voltage EVDD and the low potential driving voltage EVSS are commonly supplied to the pixels P.

Referring to FIG. 2, the display panel 100 may include two switching thin film transistors TFT1 and TFT2 and one capacitor CST.

At this time, two thin film transistors TFT1 and TFT2 may include a polycrystalline thin film transistor including a polycrystalline semiconductor material and an oxide thin film transistor including an oxide semiconductor material. For example, the thin film transistor TFT1 may be a polycrystalline thin film transistor including a polycrystalline semiconductor material and the thin film transistor TFT2 may be an oxide thin film transistor including an oxide semiconductor material.

The polycrystalline thin film transistor TFT1 illustrated in FIG. 2 is an emission switching thin film transistor connected to the light emitting diode OLED and the oxide thin film transistor TFT2 may be a switching thin film transistor connected to the capacitor CST.

One pixel P includes the light emitting diode OLED and a pixel driving circuit which applies a driving current to the light emitting diode OLED. The pixel driving circuit is disposed on the substrate 111 and the light emitting diode OLED is disposed on the pixel driving circuit. Further, an encapsulation layer 120 is disposed on the light emitting diode OLED. The encapsulation layer 120 protects the light emitting diode OLED.

The pixel driving circuit may include a driving thin film transistor, a switching thin film transistor, and a capacitor. Further, the light emitting diode OLED may include an anode electrode, a cathode electrode and an emission layer disposed therebetween.

For example, the display panel 100 may use oxide semiconductor as active layers of the driving thin film transistor and at least one switching thin film transistor. The thin film transistor which uses the oxide semiconductor material as an active layer has an excellent leakage current blocking effect and has a manufacturing cost which is relatively cheaper than a thin film transistor which uses a polycrystalline semiconductor material as an active layer. Accordingly, the pixel driving circuit is implemented with the driving thin film transistor and at least one switching thin film transistor which use oxide semiconductor materials to reduce power consumption and save a manufacturing cost.

At this time, all the thin film transistors which configure the pixel driving circuit may be implemented using the oxide semiconductor material, but are not limited thereto.

A thin film transistor using the oxide semiconductor material is hard to ensure the reliability and the thin film transistor using the polycrystalline semiconductor material has a fast operation speed and an excellent reliability. Accordingly, the pixel driving circuit may be configured to include both the switching thin film transistor using the oxide semiconductor material and the switching thin film transistor using the polycrystalline semiconductor material. For example, the driving thin film transistor and at least one switching thin film transistor which configure the pixel driving circuit use the polycrystalline semiconductor material as an active layer and only some of switching thin film transistors may be implemented using the oxide semiconductor material.

The substrate 111 may be configured as a multi-layer in which an organic film and an inorganic film are alternately laminated. For example, in the substrate 111, an organic film such as polyimide and an inorganic film such as silicon oxide $SiO_2$ may be alternately laminated.

A lower buffer layer 112*a* is disposed on the substrate 111. The lower buffer layer 112*a* is provided to block moisture penetrating from the outside and may be used by laminating a plurality of silicon oxide ($SiO_2$) films. An auxiliary buffer layer 112*b* may be further disposed on the lower buffer layer 112*a* to protect the element from the moisture permeation.

The polycrystalline thin film transistor TFT1 is disposed on the substrate 111.

The polycrystalline thin film transistor TFT1 includes a first active layer ACT1 including polycrystalline semiconductor as an active layer, a first gate electrode GE1, a first source electrode SD1, and a first drain electrode SD2.

The first active layer ACT1 includes a channel through which electrons or holes move. The first active layer ACT1 includes a first channel region, a first source region which is disposed on one side of the first channel region and a first drain region disposed on the other side. The first source region and the first drain region are disposed with the first channel region therebetween. The first source region and the first drain region are regions in which an intrinsic polycrystalline semiconductor material is doped with group 5 or group 3 impurity ions, for example, phosphorus (P) or boron (B) at a predetermined concentration to be conductive. In the first channel region, the polycrystalline semiconductor material maintains an intrinsic state and a path through which the electrons or holes move is provided.

The first gate electrode GE1 overlaps a first channel region of the first active layer ACT1.

A first gate insulating layer 113 is disposed between the first gate electrode GE1 and the first active layer ACT1. The first gate insulating layer 113 may be implemented by a single layer of an inorganic layer such as a silicon oxide ($SiO_2$) film or a silicon nitride (SiNx) film or may be implemented by laminating a plurality of inorganic layers.

The polycrystalline thin film transistor TFT1 illustrated in FIG. 2 has a top gate structure in which the first gate electrode GE1 is located above the first active layer ACT1. At this time, the first gate electrode GE1 of the polycrystalline thin film transistor TFT1, the first electrode CST1 included in the capacitor CST, and a light shielding layer LS included in the oxide thin film transistor TFT2 may be formed on the same layer with the same material. That is, the first gate electrode GE1, the first electrode CST1, and the light shielding layer LS are simultaneously formed by one mask process so that the number of mask processes may be reduced.

The first gate electrode GE1 is configured by a metal material. For example, the first gate electrode GE1 may be a single layer or a plurality of layers formed of any one of molybdenum (Mo), aluminum (Al), chrome (Cr), gold (Au), titanium (Ti), nickel (Ni), neodymium (Nd), and copper (Cu) or an alloy thereof, but is not limited thereto.

A first interlayer insulating layer 114 is disposed on the first gate electrode GE1. The first interlayer insulating layer 114 may be configured by silicon oxide (SiO2), silicon nitride (SiNx), or the like.

The display panel 100 may further include an upper buffer layer 115, a second gate insulating layer 116, and a second interlayer insulating layer 117 which are sequentially disposed on the first interlayer insulating layer 114.

The first source electrode SD1 and the first drain electrode SD2 of the polycrystalline thin film transistor TFT1 are formed on the second interlayer insulating layer 117 and are connected to the first source region and the first drain region of the first active layer ACT1, respectively.

The first source electrode SD1 and the first drain electrode SD2 may be formed of a single layer or a plurality of layers formed of any one of molybdenum (Mo), aluminum (Al), chrome (Cr), gold (Au), titanium (Ti), nickel (Ni), neodymium (Nd), and copper (Cu) or an alloy thereof, but are not limited thereto.

The upper buffer layer 115 separates the second active layer ACT2 of the oxide thin film transistor TFT2 from the first active layer ACT1 of the polycrystalline thin film transistor TFT2 and provides a base for forming the second active layer ACT2.

The oxide thin film transistor TFT2 is disposed on the upper buffer layer 115.

The oxide thin film transistor TFT2 includes a second active layer ACT2 implemented by an oxide semiconductor material, a second gate electrode GE2 disposed on the second gate insulating layer 116, and a second source electrode SD3 and a second drain electrode SD4 disposed on the second interlayer insulating layer 117.

The second active layer ACT2 includes an intrinsic second channel region which is implemented by the oxide semiconductor material and is not doped with an impurity and a second source region and a second drain region which are doped with an impurity to become conductive.

The second gate insulating layer 116 covers the second active layer ACT2 of the oxide thin film transistor TFT2. The second gate insulating layer 116 is formed on the second active layer ACT2 implemented by the oxide semiconductor material so that the second gate insulating layer may be implemented by an inorganic film. For example, the second gate insulating layer 116 may be silicon oxide (SiO2), silicon nitride (SiNx), or the like.

The second gate electrode GE2 is configured by a metal material. For example, the second gate electrode GE2 may be a single layer or a plurality of layers formed of any one of molybdenum (Mo), aluminum (Al), chrome (Cr), gold (Au), titanium (Ti), nickel (Ni), neodymium (Nd), and copper (Cu) or an alloy thereof, but is not limited thereto.

The oxide thin film transistor TFT2 may further include a light shielding layer LS which is located below the upper buffer layer 115 and overlaps the second active layer ACT2. The light shielding layer LS blocks light incident onto the second active layer ACT2 to ensure the reliability of the oxide thin film transistor TFT2. The light shielding layer LS is formed by the same material as the first gate electrode GE1 and may be formed on an upper surface of the first gate insulating film 113. The light shielding layer LS is electrically connected to the second gate electrode GE2 to configure a dual gate.

The second source electrode SD3 and the second drain electrode SD4 are formed of the same material as the first source electrode SD1 and the first drain electrode SD2 on the second interlayer insulating layer 117. In this case, the second source electrode SD3, the second drain electrode SD4, the first source electrode SD1, and the first drain electrode SD2 are simultaneously formed by one mask process to reduce the mask process.

The capacitor CST includes a first electrode CST1 disposed on the first gate insulating layer 113 and a second electrode CST2 disposed on the first interlayer insulating layer 114 so as to overlap the first electrode CST1. For example, the second electrode CST2 may be a single layer or a plurality of layers formed of any one of molybdenum (Mo), aluminum (Al), chrome (Cr), gold (Au), titanium (Ti), nickel (Ni), neodymium (Nd), and copper (Cu), or an alloy thereof.

The capacitor CST stores a data voltage which is applied through the data line DL for a predetermined period and then supplies the data voltage to the light emitting diode OLED. The capacitor CST includes two corresponding electrodes and a dielectric material disposed therebetween. The first interlayer insulating layer 114 is located between the first electrode CST1 and the second electrode CST2.

The first electrode CST1 or the second electrode CST2 of the capacitor CST may be electrically connected to the second source electrode SD3 or the second drain electrode SD4 of the oxide thin film transistor TFT2, but is not limited thereto. That is, a connection relationship of the capacitor CST may be changed according to a structure of the pixel driving circuit.

In the meantime, a first planarization layer 118 and a second planarization layer 119 are sequentially disposed on the pixel driving circuit to planarize an upper end of the pixel driving circuit. The first planarization layer 118 and the second planarization layer 119 may be organic films, such as polyimide or acryl resin.

Further, the light emitting diode OLED is formed on the second planarization layer 119.

The light emitting diode OLED includes an anode electrode ANO, a cathode electrode CAT, and an emission layer EL disposed between the anode electrode ANO and the cathode electrode CAT. If a pixel driving circuit which commonly uses a low potential voltage connected to the cathode electrode CAT is implemented, the anode electrode ANO is disposed as a separate electrode in every sub pixel. If a pixel driving circuit which commonly uses a high potential voltage is implemented, the cathode electrode CAT may be disposed as a separate electrode in every sub pixel.

The light emitting diode OLED is electrically connected to the driving element through an intermediate electrode CNE disposed on the first planarization layer 118. Specifically, the anode electrode ANO of the light emitting diode OLED and the first source electrode SD1 of the polycrystalline thin film transistor TFT1 which configures the pixel driving circuit are connected to each other by the intermediate electrode CNE.

The anode electrode ANO is connected to the intermediate electrode CNE exposed through the contact hole which passes through the second planarization layer 119. Further, the intermediate electrode CNE is connected to the first source electrode SD1 exposed through the contact hole which passes through the first planarization layer 118.

The intermediate electrode CNE serves as a medium connecting the first source electrode SD1 and the anode electrode ANO. The intermediate electrode CNE may be formed of a conductive material, such as copper (Cu), silver (Ag), molybdenum (Mo), or titanium (Ti).

The anode electrode ANO may be formed to have a multi-layered structure including a transparent conductive film and an opaque conductive film having high reflection efficiency. The transparent conductive film is configured with a material having a relatively high work function, such as indium-tin-oxide (ITO) or indium-zinc-oxide (IZO). The opaque conductive film is configured as a single-layered or multi-layered structure including aluminum (Al), silver (Ag), copper (Cu), lead (Pb), molybdenum (Mo), titanium (Ti), or an alloy thereof. For example, the anode electrode ANO is formed with a structure in which a transparent conductive film, an opaque conductive film, and a transparent conductive film are sequentially laminated or may be formed with a structure in which a transparent conductive film and an opaque conductive film are sequentially laminated.

The emission layer EL may be formed by laminating a hole related layer, an organic emission layer, and an electron related layer on the anode electrode ANO in this order or in a reverse order.

A bank layer BNK may be a pixel definition film which exposes the anode electrode ANO of each pixel P. The bank layer BNK may be formed of an opaque material (for example, black) to suppress the light interference between adjacent pixels P. In this case, the bank layer BNK includes a light shielding material which is formed of at least any one of a color pigment, organic black, and carbon. A spacer 700 may be further disposed on the bank layer BNK.

The cathode electrode CAT is formed on a top surface and a side surface of the emission layer EL so as to be opposite to the anode electrode ANO with the emission layer EL therebetween. The cathode electrode CAT is integrally formed on the entire active area AA. When the cathode electrode CAT is applied to a top-emission type organic light emitting display device, the cathode electrode may be configured by a transparent conductive film, such as indium-tin-oxide (ITO) or indium-zinc-oxide (IZO).

The encapsulation layer 120 may be further disposed on the cathode electrode CAT to suppress moisture permeation.

The encapsulation layer 120 may block moisture or oxygen from being permeated into the light emitting diode EL which is vulnerable to the moisture or oxygen from the outside. To this end, the encapsulation layer 120 may include at least one inorganic encapsulation layer and at least one organic encapsulation layer, but is not limited thereto. In the example embodiment of the present disclosure, a structure of the encapsulation layer 260 in which a first encapsulation layer 121, a second encapsulation layer 122, and a third encapsulation layer 123 are sequentially laminated will be described as an example.

The first encapsulation layer 121 is formed on the substrate 111 on which the cathode electrode CAT is formed. The third encapsulation layer 123 is formed on the substrate 111 on which the second encapsulation layer 122 may be formed and encloses a top surface, a bottom surface, and a side surface of the second encapsulation layer 122 together with the first encapsulation layer 121. The first encapsulation layer 121 and the third encapsulation layer 123 may minimize or suppress the permeation of external moisture or oxygen into the light emitting diode EL. The first encapsulation layer 121 and the third encapsulation layer 123 are formed of an inorganic insulating material on which low-temperature deposition is allowed, such as silicon nitride (SiNx), silicon oxide (SiOx), silicon oxynitride (SiON), or aluminum oxide $Al_2O_3$. The first encapsulation layer 121 and the third encapsulation layer 123 are deposited under a low temperature atmosphere so that the damage of the light emitting diode EL which is vulnerable to a high temperature atmosphere may be suppressed during the deposition process of the first encapsulation layer 121 and the third encapsulation layer 123.

The second encapsulation layer 122 serves as a buffer which alleviates stress between layers due to the bending of the display device 10 and may planarize the step between layers. The second encapsulation layer 122 may be formed of acryl resin, epoxy resin, phenolic resin, polyamide resin, polyimide resin, and polyethylene or a non-photosensitive organic insulating material such as silicon oxy carbon (SiOC), or a photosensitive organic insulating material such as photoacryl, on the substrate 111 on which the first encapsulation layer 121 is formed, but is not limited thereto. When the second encapsulation layer 122 is formed using an inkjet method, a dam DAM may be disposed to suppress a liquefied second encapsulation layer 122 from being diffused to an edge of the substrate 111. The dam DAM may be disposed to be closer to the edge of the substrate 111 than the second encapsulation layer 122. The dam DAM may suppress the second encapsulation layer 122 from being diffused into a pad region where a conductive pad disposed at an outermost periphery of the substrate 111 is disposed.

The dam DAM is designed to suppress the diffusion of the second encapsulation layer 122. However, when the second encapsulation layer 122 is formed to exceed a height of the dam DAM during the process, the second encapsulation layer 122 which is an organic layer may be exposed to the outside so that moisture may be easily permeated into the light emitting diode. Therefore, in order to avoid the above-mentioned problem, at least ten dams DAM may be repeatedly formed.

The dam DAM may be disposed on the second interlayer insulating layer 117 of the non-active area NA.

Further, the dam DAM may be simultaneously formed with the first planarization layer 118 and the second planarization layer 119. When the first planarization layer 118 is formed, a lower layer of the dam DAM is formed together and when the second planarization layer 119 is formed, an upper layer of the dam DAM is formed together so that the dam DAM may be laminated to have a double-layered structure.

Therefore, the dam DAM may be configured with the same material as the first planarization layer 118 and the second planarization layer 119, but is not limited thereto.

The dam DAM may be disposed to overlap a low potential driving power line VSS. For example, on a lower layer of a region of the non-display area NA where the dam DAM is located, the low potential driving power line VSS may be formed.

The low potential driving power line VSS and the gate driver 300 configured in a gate-in-panel (GIP) manner are formed to enclose the outer periphery of the display panel and the low potential driving power line VSS may be located at the outer periphery more than the gate driver 300. Further, the low potential driving power line VSS is connected to the cathode electrode CAT to apply a common voltage. Even though the gate driver 300 is simply illustrated in a plan view and a cross-sectional view, the gate driver 300 may be configured using a thin film transistor having the same structure as the thin film transistor of the active area DAA.

The low potential driving power line VSS is disposed at the outside more than the gate driver 300. The low potential driving power line VSS is disposed at the outside more than the gate driver 300 and encloses the active area AA. For example, the low potential driving power line VSS may be formed of the same material as the first gate electrode GE1, but is not limited thereto and may be formed of the same material as the second electrode CST2 or the first source and drain electrodes SD1 and SD2, but is not limited thereto.

Further, the low potential driving power line VSS may be electrically connected to the cathode electrode CAT. The low potential driving power line VSS may supply a low potential driving voltage EVSS to the plurality of pixels P of the active area AA.

A touch layer may be disposed on the encapsulation layer 120. A touch buffer film 151 is disposed between a touch sensor metal including touch electrode connection lines 152 and 154 and touch electrodes 155 and 156 and a cathode electrode CAT of the light emitting diode EL on the touch layer.

The touch buffer film 151 may suppress the permeation of a chemical solution (a developer, an etchant, or the like) used for a manufacturing process of a touch sensor metal disposed on the touch buffer film 151 or moisture from the outside into the emission layer EL including an organic material. By doing this, the touch buffer film 151 may suppress the damage of the emission layer EL which is vulnerable to the chemical solution or the moisture.

The touch buffer film 151 may be formed of an organic insulating material which is formed at a low temperature of a predetermined temperature (for example, 100° C.) or lower to suppress the damage of the emission layer EL including an organic material which is vulnerable to a high temperature. The organic insulating material has a low permittivity of 1 to 3. For example, the touch buffer film 151 may be formed of an acrylic, epoxy, or siloxane-based material. The touch buffer film 151 which is formed of an organic insulating material and has a planarization performance may suppress a damage of the encapsulation layer 120 caused by the bending of the organic light emitting display device and the breakage of the touch sensor metal formed on the touch buffer film 151.

According to a mutual-capacitance based touch sensor structure, the touch electrodes 155 and 156 are disposed on the touch buffer film 151 and the touch electrodes 155 and 156 may be alternately disposed.

The touch electrode connection lines 152 and 154 may electrically connect the touch electrodes 155 and 156. The touch electrode connection lines 152 and 154 and the touch electrodes 155 and 156 may be disposed on different layers with the touch insulating film 153 therebetween.

The touch electrode connection lines 152 and 154 are disposed so as to overlap the bank layer 165 to suppress the degradation of the aperture ratio.

In the meantime, in the touch electrodes 155 and 156, a part of the touch electrode connection line 152 passes through an upper portion and a side surface of the encapsulation layer 120 and an upper portion and a side surface of the dam DAM to be electrically connected to a touch driving circuit (not illustrated) through the touch pad PAD.

A part of the touch electrode connection line 152 is supplied with a touch driving signal from the touch driving circuit to transmit the touch driving signal to the touch electrodes 155 and 156 and may transmit a touch sensing signal in the touch electrodes 155 and 156 to the touch driving circuit.

A touch protection film 157 may be disposed on the touch electrodes 155 and 156. In the drawing, even though it is illustrated that the touch protection film 157 is disposed only on the touch electrodes 155 and 156, it is not limited thereto and the touch protection film 157 extends before and after the dam DAM to be disposed on the touch electrode connection line 152.

Further, a color filter (not illustrated) may be further disposed on the encapsulation layer 120 and the color filter may be disposed on the touch layer or located between the encapsulation layer 120 and the touch layer.

Figure 3:
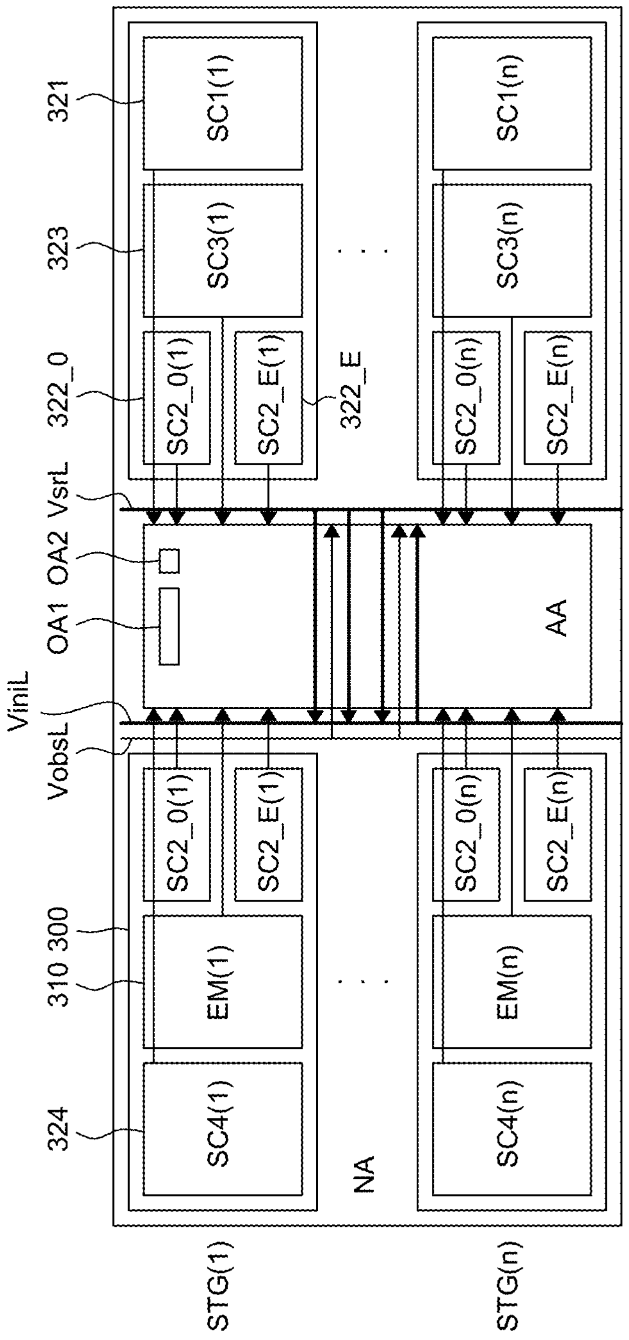
FIG. 3 is a view of a configuration of a gate driver in a display device according to an example embodiment of the present disclosure.

FIG. 3 is a view of a configuration of a gate driver in a display device according to an example embodiment of the present disclosure.

Referring to FIG. 3, the gate driver 300 is configured by an emission control signal driver 310 and a scan driver 320. The scan driver 320 may be configured by first to fourth scan drivers 321, 322, 333, and 334. Further, the second scan driver 322 may be configured by an odd-numbered second scan driver 322_O and an even-numbered second scan driver 322_E.

In the gate driver 300, shift registers may be symmetrically disposed on both sides of the active area AA. Further, in the gate driver 300, a shift register at one side of the active area AA includes second scan drivers 322_O and 322_E, a fourth scan driver 324, and an emission control signal driver 310, respectively. A shift register at the other side of the active area AA may include a first scan driver 321, second scan drivers 322_O and 322_E, and a third scan driver 323, respectively. However, the present disclosure is not limited thereto and the emission control signal driver 310 and the first to fourth scan drivers 321, 322, 323, and 324 may be disposed in different ways according to the example embodiments.

Each of stages STG1 to STGn of the shift register may include first scan signal generators SC1(1) to SC1($n$), second scan signal generators SC2_O(1) to SC2_O(n), SC2_E (1) to SC2_E(n), third scan signal generators SC3(1) to SC3($n$), fourth scan signal generators SC4(1) to SC4($n$), and emission control signal generators EM(1) to EM(n), respectively.

The first scan signal generators SC1(1) to SC1($n$) output first scan signals SC1(1) to SC1($n$) through first gate lines SCL1 of the display panel 100. The second scan signal generators SC2(1) to SC2($n$) output second scan signals SC2(1) to SC2($n$) through second gate lines SCL2 of the display panel 100. The third scan signal generators SC3(1) to SC3($n$) output third scan signals SC3(1) to SC3($n$) through third gate lines SCL3 of the display panel 100. The fourth scan signal generators SC4(1) to SC4($n$) output fourth scan signals SC4(1) to SC4($n$) through fourth gate lines SCL4 of the display panel 100. The emission control signal generators EM(1) to EM(n) output emission control signals EM(1) to EM(n) through emission control lines EML of the display panel 100.

The first scan signals SC1(1) to SC1($n$) may be used as signals to drive an A-th transistor (for example, a compensation transistor) included in the pixel circuit. The second scan signals SC2(1) to SC2($n$) are used as signals to drive a B-th transistor (for example, a data supply transistor) included in the pixel circuit. The third scan signals SC3(1) to SC3($n$) are used as signals to drive a C-th transistor (for example, a bias transistor) included in the pixel circuit. The fourth scan signals SC4(1) to SC4($n$) are used as signals to drive a D-th transistor (for example, an initialization transistor) included in the pixel circuit. The emission control signals EM(1) to EM(n) may be used as signals to drive an E-th transistor (for example, an emission control transistor) included in the pixel circuit. For example, when the emission control transistors of pixels are controlled using emission control signals EM(1) to EM(n), an emission time of the light emitting diode is variable.

Referring to FIG. 3, a bias voltage bus line VobsL, a first initialization voltage bus line VarL, and a second initialization voltage bus line ViniL may be disposed between the gate driver 300 and the active area AA.

The bias voltage bus line VobsL, the first initialization voltage bus line VarL, and the second initialization voltage bus line ViniL may supply a bias voltage Vobs, a first initialization voltage Var, and a second initialization voltage Vini from the power supply unit 500 to the pixel circuit.

In the drawing, it is illustrated that the bias voltage bus line VobsL, the first initialization voltage bus line VarL, and the second initialization voltage bus line ViniL are disposed at only one side of a left side or a right side of the active area AA, but the present disclosure is not limited thereto, and may be disposed at both sides. Further, even though the bias voltage bus line VobsL, the first initialization voltage bus line VarL, and the second initialization voltage bus line ViniL are disposed at one side, it is not limited to a left position or a right position.

Referring to FIG. 3, in the active area AA, one or more optical areas OA1 and OA2 may be disposed.

One or more optical areas OA1 and OA2 may be disposed so as to overlap one or more optical electronic devices, such as an image capturing device such as a camera (image sensor) and a detection sensor such as a proximity sensor and an illuminance sensor.

In one or more optical areas OA1 and OA2, a light transmission structure is formed to have a predetermined level or higher of transmittance for an operation of an optical electronic device. In other words, the number of pixels P per unit area in one or more optical areas OA1 and OA2 may be smaller than the number of pixels P per unit area in a normal area excluding the optical areas OA1 and OA2, in the active area AA. That is, the resolution of one or more optical areas OA1 and OA2 may be lower than a resolution of a normal area in the active area AA.

A light transmission structure in one or more optical areas OA1 and OA2 may be configured by patterning the cathode electrode in a part in which the pixel P is not disposed. At this time, the cathode electrode to be patterned may be removed using laser or the cathode electrode is selectively formed to be patterned using a material such as a cathode deposition stop layer.

Further, in one or more optical areas OA1 and OA2, the optical transmission structure may be configured by separately forming the light emitting diode EL and the pixel circuit in the pixel P. In other words, the light emitting diode EL of the pixel P is located on the optical areas OA1 and OA2 and the plurality of transistors TFT which configures the pixel circuit is disposed in the vicinity of the optical areas OA1 and OA2. Therefore, the light emitting diode EL and the pixel circuit may be electrically connected by means of a transparent metal layer.

Figure 4:
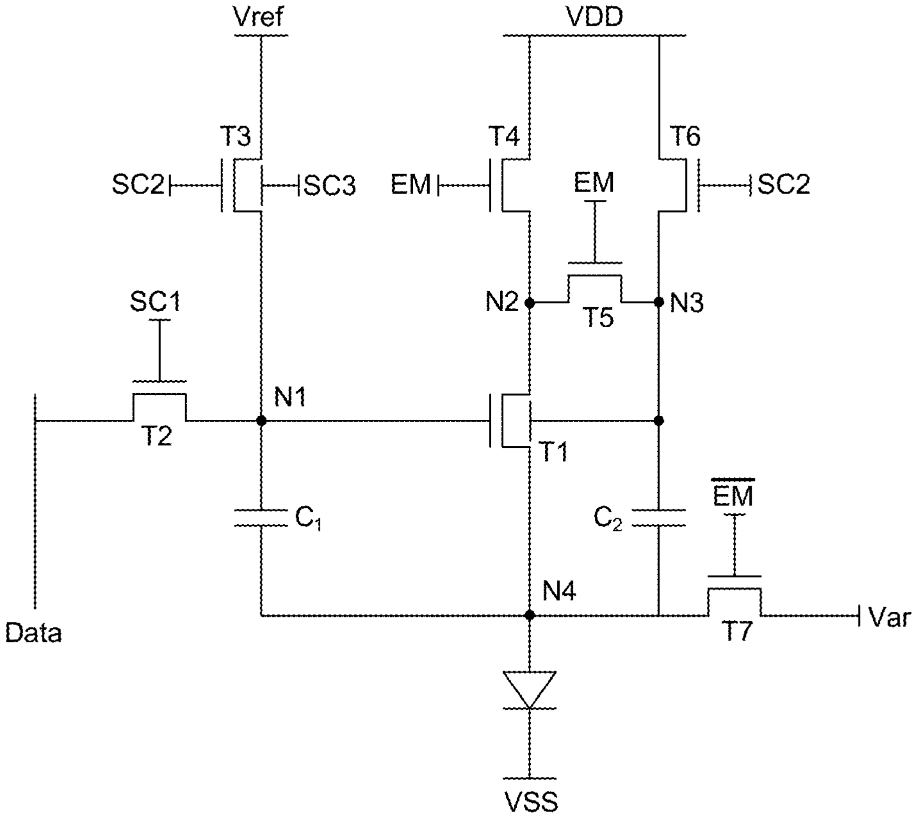
FIG. 4 is a view illustrating a pixel circuit according to an example embodiment of the present disclosure.

FIG. 4 is a view illustrating a pixel circuit according to an example embodiment of the present disclosure.

Referring to FIG. 4, each of the plurality of pixels P may include a pixel circuit having a driving transistor DT and a light emitting diode EL connected to the pixel circuit.

The pixel circuit controls the driving current which flows in the light emitting diode EL to drive the light emitting diode EL. The pixel circuit may include first to seventh transistors T1 to T7 and first and second capacitors C1 and C2. Each of the transistors T1 to T7 may include a first electrode, a second electrode, and a gate electrode. One of the first electrode and the second electrode is a source electrode and the other one of the first electrode and the second electrode may be a drain electrode.

Each of the transistors DT, T1 to T7 may be a P-type thin film transistor or an N-type thin film transistor. In the example embodiment of FIG. 4, all the first to seventh transistors are configured as P-type thin film transistors, but are not limited thereto so that all or some of the transistors T1 to T7 may be P-type thin film transistors or N-type thin film transistors. Further, the N-type thin film transistor may be an oxide thin film transistor and the P-type thin film transistor may be a polycrystalline silicon thin film transistor.

Hereinafter, it is described that first to seventh transistors T1 to T7 are P-type thin film transistors. Accordingly, the first to seventh transistors T1 to T7 are applied with a high voltage to be turned on.

According to the example embodiment, the first transistor T1 which configures the pixel circuit serves as a driving transistor, the second transistor T2 serves as a data supplying transistor, and the third and seventh transistors T3 and T7 serve as initialization transistors. The fourth transistor T4 may serve as an emission control transistor, the fifth transistor T5 serves as a compensation transistor, and the sixth transistor T6 may serve as a transfer transistor.

The light emitting diode EL may include an anode electrode and a cathode electrode. The anode electrode of the light emitting diode EL is connected to a fourth node N4 and the cathode electrode may receive a low potential driving voltage VSS.

The first transistor T1 may include a first electrode connected to a second node N2, a second electrode connected to a fourth node N4, a first dual gate electrode connected to a first node N1, and a second dual gate electrode connected to a third node N3. The first transistor T1 may supply a driving current Id to the light emitting diode EL based on a voltage of the first node N1 (or a data voltage stored in the first capacitor C1) and a voltage of the third node N3 (for example, a compensation voltage VB).

The second transistor T2 may include a first electrode which receives a data voltage VData, a second electrode connected to the first node N1, and a gate electrode which receives a first scan signal SC1. The second transistor T2 is turned on in response to a first scan signal SC1 and may transmit the data voltage Vdata to the first node N1. Such a second transistor T2 may be a data supply transistor.

The third transistor T3 may include a first electrode which receives a reference voltage VREF, a second electrode connected to the first node N1, a first dual gate electrode which receives the second scan signal SC2, and a second dual gate electrode which receives the third scan signal SC3. The third transistor T3 is turned on in response to the second scan signal SC2 or the third scan signal SC3 and may transmit the reference voltage VREF to the first node N1.

The fourth transistor T4 may include a first electrode which receives a high potential driving voltage VDD, a second electrode connected to the second node N2, and a gate electrode which receives an EM signal. The fourth transistor T4 is turned on in response to the EM signal and may transmit the high potential driving voltage VDD to the second node N2. Such a fourth transistor T4 may be an emission control transistor.

According to one example embodiment, the fourth transistor T4 is connected between the high potential voltage VDD and the light emitting diode EL and may form a current movement path through which a driving current Id generated by the first transistor T1 moves. The fourth transistor T4 is turned on in response to the EM signal and in this case, the driving current Id is supplied to the light emitting diode EL and the light emitting diode EL may emit light with a luminance corresponding to the driving current Id.

The fifth transistor T5 may include a first electrode connected to the third node N3, a second electrode connected to the second node N2, and a gate electrode which receives a third scan signal SC3. The fifth transistor T5 is turned on in response to the third scan signal SC3 and is diode-connected between the third node N3 and the second node N2 to sample a threshold voltage of the first transistor T1. Such a fifth transistor T5 may be a compensation transistor.

The sixth transistor T6 may include a first electrode which receives a high potential driving voltage VDD, a second electrode connected to the third node N3, and a gate electrode which receives the second scan signal SC2. The sixth transistor T6 is turned on in response to the second scan signal SC2 and may transmit the high potential driving voltage VDD to the third node N3. Such a sixth transistor T6 may be a transfer transistor.

For reference, a first capacitor C1 may be connected or formed between the first node N1 and the fourth node N4. An energy corresponding to a difference between a voltage of the first node N1 (for example, a reference voltage VREF or the data voltage) and a voltage of the fourth node N4 (for example, an initialization voltage VAR) may be stored.

A second capacitor C2 may be connected or formed between the third node N3 and the fourth node N4. An energy corresponding to a difference between a voltage of the third node N3 (for example, the high potential driving voltage VDD or the compensation voltage VB) and a voltage of the fourth node N4 (for example, an initialization voltage VAR) may be stored.

The seventh transistor T7 may include a first electrode which receives the initialization voltage VAR, a second electrode connected to the fourth node N4, and a gate electrode which receives an inverse EM signal. The seventh transistor T7 is turned on in response to the inverse EM signal and may transmit the initialization voltage VAR to the fourth node N4. Such a seventh transistor T7 may be an initialization transistor.

The seventh transistor T7 is turned on in response to the inverse EM signal, before the light emitting diode EL emits light (or after the light emitting diode EL emits light) and may initialize the anode electrode (or the pixel electrode) of the light emitting diode EL using the initialization voltage VAR. The light emitting diode EL may have a parasitic capacitor formed between the anode electrode and the cathode electrode. Further, the parasitic capacitor is charged while the light emitting diode EL emits light so that the anode electrode of the light emitting diode EL may have a specific voltage. Accordingly, the initialization voltage VAR is applied to the anode electrode of the light emitting diode EL through the seventh transistor T7 to initialize a quantity of charges accumulated in the light emitting diode EL.

Figure 5:
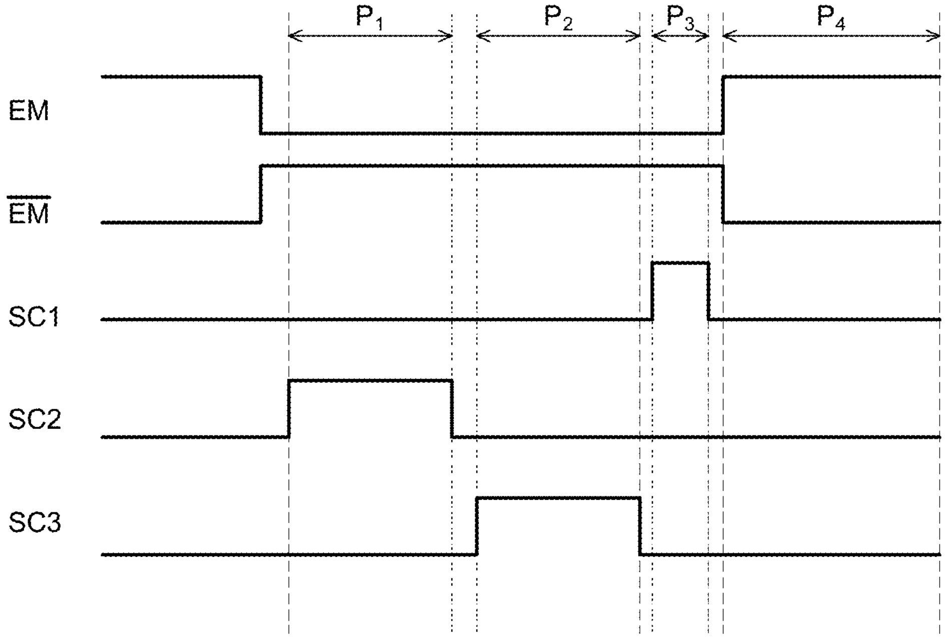
FIG. 5 is a waveform chart for pixel operation of a display device according to an example embodiment of the present disclosure.

FIG. 5 is a waveform chart for pixel operation of a display device according to an example embodiment of the present disclosure. FIGS. 6A to 6D are views for explaining an operation state of a pixel circuit according to a waveform chart of FIG. 5.

According to an example embodiment of the present disclosure, the display device may include a gate driver, a power supply unit, and a plurality of pixels. The gate driver supplies a first scan signal, a second scan signal, a third scan signal, and an EM signal to gate lines. The power supply unit generates and outputs a high potential driving voltage, a low potential driving voltage, a reference voltage, and an initialization voltage to power lines. The plurality of pixels is disposed along a matrix shape defined by intersecting data lines and gate lines.

Referring to FIG. 5, the pixel circuit may divide one frame into a plurality of periods using a plurality of signals (for example, first to third scan signals SC1 to SC3, and an EM signal). Here, the inverse EM signal of FIG. 5 may be configured to have a voltage level opposite to the EM signal. The inverse EM signal may be generated from the EM signal using, for example, an inverter.

According to one example embodiment of the present disclosure, a first period P1 and a second period P2 operate as times corresponding to 4 horizontal times 4HT and a third period P3 may operate as a time corresponding to 1HT. The first period P1 and the second period P2 substantially operate as the same time and the third period P3 operates as a time relatively shorter than that of the first period P1 and the second period P2.

Figure 6A:
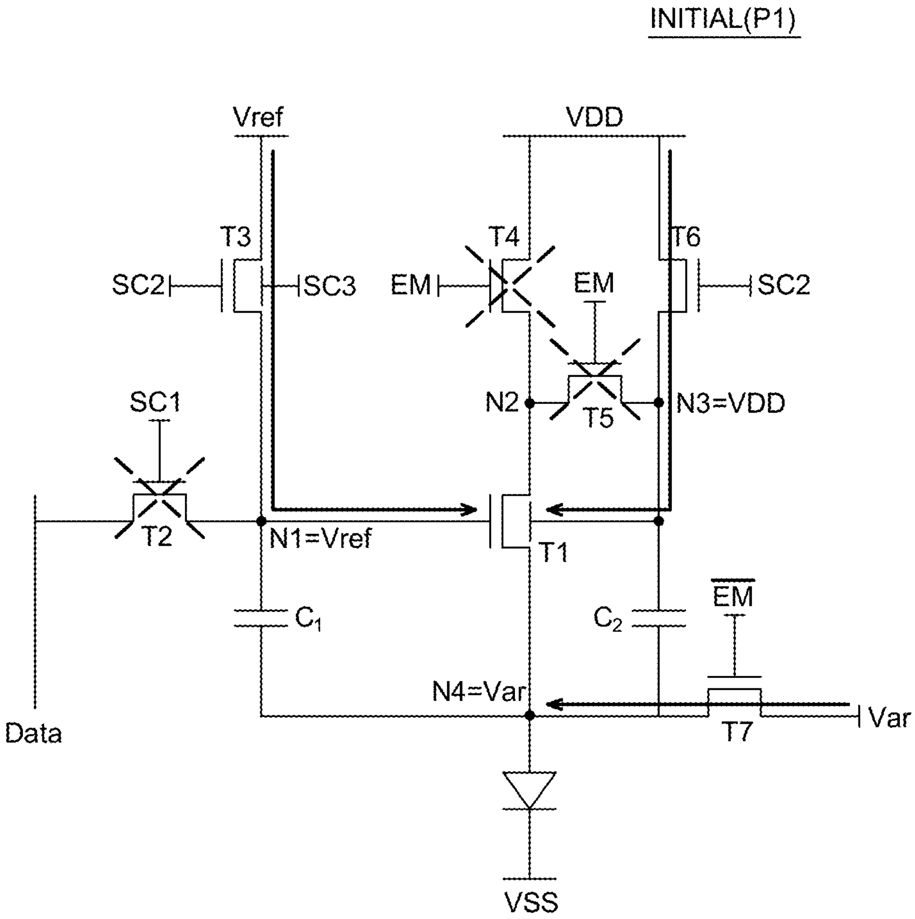
FIGS. 6A to 6D are views for explaining an operation state of a pixel circuit according to a waveform chart of FIG. 5.

Referring to FIGS. 5 and 6A, in the first period P1, the gate driver supplies the second scan signal SC2 and the inverse EM signal as high levels and may supply the first scan signal SC1, the third scan signal SC3, and the EM signal EM as low levels. The first period P1 may be an initialization period.

In the first period P1, the third transistor T3 is turned on in response to the second scan signal SC2, the sixth transistor T6 is turned on in response to the second scan signal SC2, and the seventh transistor T7 may be turned on in response to the inverse EM signal. Further, in the first period P1, the second transistor T2 is turned off in response to the first scan signal SC1, the fourth transistor T4 is turned off in response to the EM signal EM, and the fifth transistor T5 may be turned off in response to the third scan signal SC3.

In the first period P1, the third transistor T3 is turned on and the reference voltage VREF is transmitted to the first node N1, the sixth transistor T6 is turned on and the high potential driving voltage VDD is transmitted to the third node N3, and the seventh transistor T7 is turned on and the initialization voltage VAR may be transmitted to the fourth node N4.

The first capacitor C1 stores an energy corresponding to a difference of the reference voltage VREF and the initialization voltage VAR and the second capacitor C2 may store an energy corresponding to a difference of the high potential driving voltage VDD and the initialization voltage VAR.

Figure 6B:
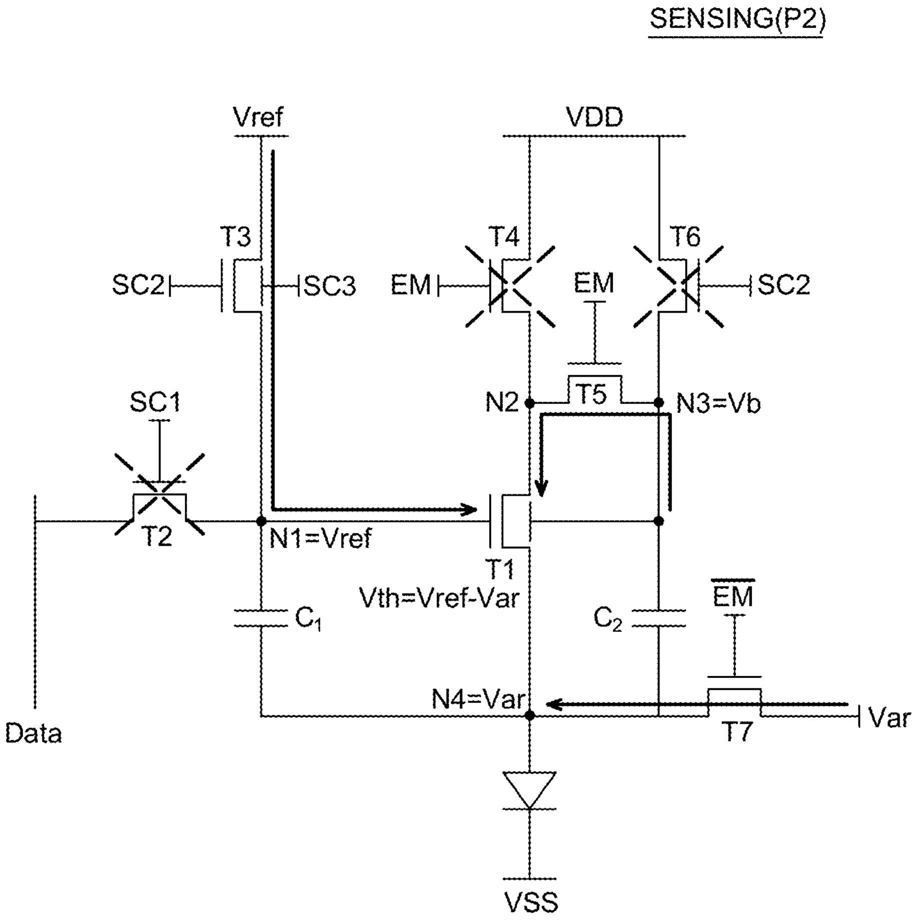

Referring to FIGS. 5 and 6B, in the second period P2, the gate driver supplies the third scan signal SC3 and the inverse EM signal as high levels and may supply the first scan signal SC1, the second scan signal SC2, and the EM signal EM as low levels. The second period P2 may be a sensing period.

In the second period P2, the third transistor T3 is turned on in response to the third scan signal SC3, the fifth transistor T5 is turned on in response to the third scan signal SC3, and the seventh transistor T7 is turned on in response to the inverse EM signal. Further, in the second period P2, the second transistor T2 is turned off in response to the first scan signal SC1, the fourth transistor T4 is turned off in response to the EM signal EM, and the sixth transistor T6 may be turned off in response to the second scan signal SC2.

In the second period P2, the third transistor T3 is turned on and the reference voltage VREF is transmitted to the first node N1, the fifth transistor T5 is turned on. Also, diode connection for the first transistor T1 is formed between the third node N3 and the second node N2, and the seventh transistor T7 is turned on and the initialization voltage VAR may be transmitted to the fourth node N4.

The first capacitor C1 stores an energy corresponding to a difference of the reference voltage VREF and the initialization voltage VAR and the second capacitor C2 may store an energy corresponding to a difference of the compensation voltage VB and the initialization voltage VAR. The compensation voltage VB may be set by the diode connection. Hereinafter, the compensation voltage VB will be described in more detail.

In the second period P2, a compensation circuit connected to the first transistor T1 samples a threshold voltage of the first transistor T1 to generate a driving current in which the threshold voltage is compensated.

According to the example embodiment of the present disclosure, the compensation circuit may include a second capacitor C2, a fifth capacitor T5, and a sixth transistor T6. One end of the second capacitor C2 is connected to the third node N3 and the other end may be connected to the fourth node N4. A first electrode of the fifth transistor T5 is connected to the third node N3, a second electrode is connected to the second node N2, and a gate electrode may receive the third scan signal SC3. A first electrode of the sixth transistor T6 receives a high potential driving voltage, a second electrode is connected to the third node N3, and a gate electrode may receive the second scan signal SC2.

According to the example embodiment of the present disclosure, in the second period P2, the fifth transistor T5 is turned on according to the third scan signal SC3 and diode connection may be formed between the second dual gate electrode and the first electrode of the first transistor T1. At this time, a voltage of the third node N3 in which the diode connection is formed may be set as a compensation voltage VB.

To be specific, the threshold voltage of the first transistor T1 is adjusted according to a voltage for the second dual gate electrode of the first transistor T1. In the second period P2, the voltage of the third node N3 drops until the threshold voltage Vth of the first transistor T1 becomes a difference of the reference voltage VREF and the initialization voltage VAR. A voltage of the third node N3 when the difference of the reference voltage VREF and the initialization voltage VAR becomes the threshold voltage Vth is referred to as the compensation voltage VB. The compensation voltage VB may vary in every pixel due to a process variation. Due to the compensation voltage VB for the second dual gate electrode of the first transistor T1, the threshold voltage Vth of the first transistor T1 may be set to a value corresponding to a difference of the reference voltage VREF and the initialization voltage VAR. The compensation voltage VB may maintain the value by the second capacitor C2 also in the third period P3 after the second period P2.

In the meantime, in the second period P2, the third transistor T3 is turned on in response to the third scan signal SC3 and the reference voltage VREF may be transmitted to the first node N1, substantially as the same as in the first period P1. The third transistor T3 is turned on by receiving the second scan signal SC2 through the first dual gate electrode in the first period P1 and may be turned on by receiving the third scan signal SC3 through the second dual gate electrode in the second period P2.

As described above, according to the example embodiment of the present disclosure, the threshold voltage of the first transistor T1 may be compensated by the compensation circuit so as to correspond to the difference of the reference voltage VREF and the initialization voltage VAR.

Figure 6C:
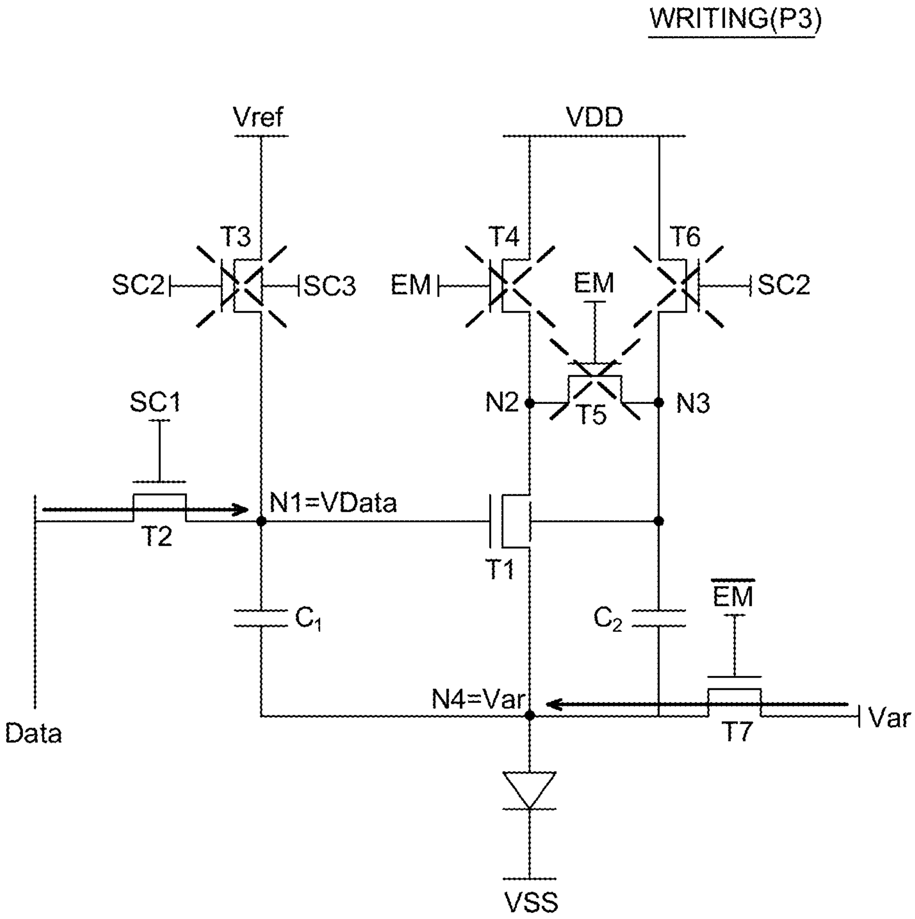

Referring to FIGS. 5 and 6C, in the third period P3, the gate driver supplies the first scan signal SC1 and the inverse EM signal as high levels and may supply the second scan signal SC2, the third scan signal SC3, and the EM signal EM as low levels. The third period P3 may be a writing period.

In the third period P3, the second transistor T2 is turned on in response to the first scan signal SC1 and the seventh transistor T7 may be turned on in response to the inverse EM signal. Further, in the third period P3, the third transistor T3 is turned off in response to the second scan signal SC2 and the third scan signal SC3 and the fourth transistor T4 is turned off in response to the EM signal EM. The fifth transistor is turned off in response to the third scan signal SC3 and the sixth transistor T6 may be turned off in response to the second scan signal SC2.

In the third period P3, the second transistor T2 is turned on and the data voltage VData is transmitted to the first node N1 and the seventh transistor T7 is turned on and the initialization voltage VAR is transmitted to the fourth node N4.

The first capacitor C1 stores an energy corresponding to a difference of the data voltage VData and the initialization voltage VAR and the second capacitor C2 may store an energy corresponding to a difference of the compensation voltage VB and the initialization voltage VAR.

Accordingly, the first transistor T1 may be driven with the threshold voltage Vth which is compensated in the second period P2 before the third period P3. Further, the first transistor T1 transmits a driving current to the light emitting diode in the fourth period P4 so as to correspond to an energy according to the data voltage VData stored in the first capacitor C1.

Figure 6D:
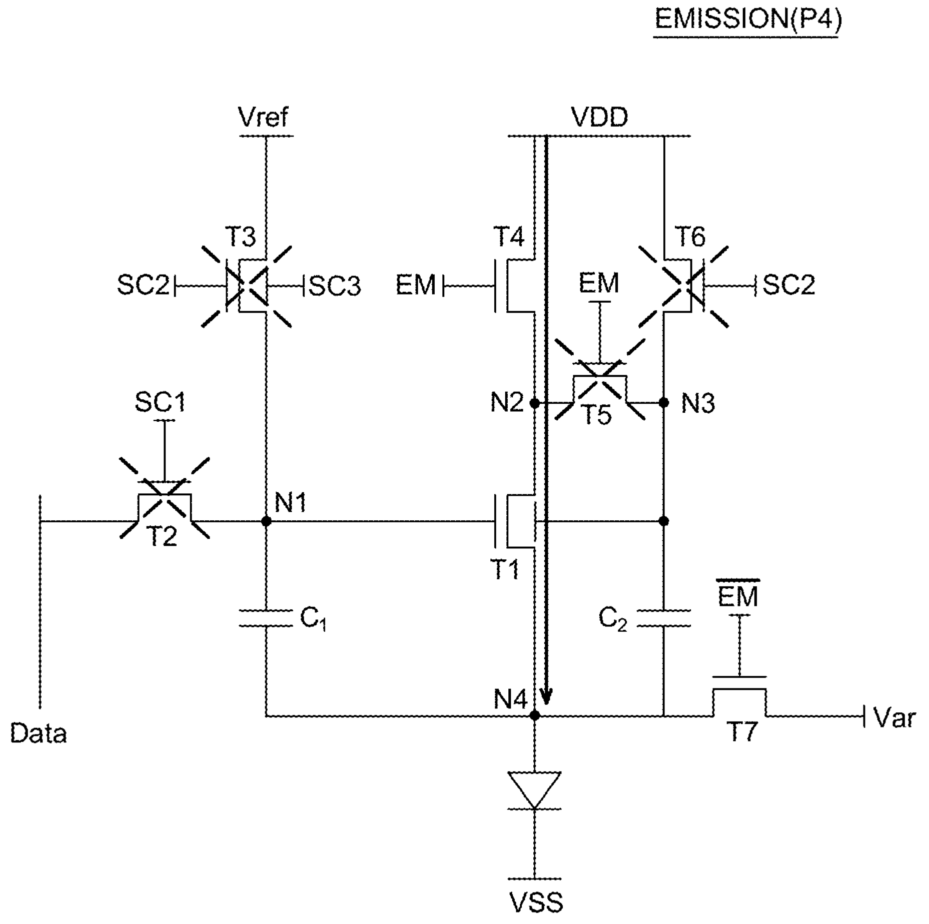

Referring to FIGS. 5 and 6D, in the fourth period P4, the gate driver may supply the EM signal as a high level and supplies the first scan signal SC1, the second scan signal SC2, the third scan signal, and the inverse EM signal as low levels. The fourth period P4 may be an emission period.

In the fourth period P4, the fourth transistor T4 may be turned on in response to the EM signal EM. Further, in the fourth period P4, the second transistor T2 is turned off in response to the first scan signal and the third transistor T3 is turned off in response to the second scan signal SC2 and the third scan signal SC3. The fifth transistor T5 is turned off in response to the third scan signal SC3, the sixth transistor T6 is turned off in response to the second scan signal SC2, and the seventh transistor T7 may be turned off in response to the inverse EM signal.

In the fourth period P4, the fourth transistor T4 is turned on and the high potential driving voltage VDD is transmitted to the second node N2. The first electrode of the first transistor T1 may receive the high potential driving voltage through the second node N2. At this time, the first transistor T1 may adjust a driving current which is transmitted to the light emitting diode based on a voltage of the first node N1 connected to the first dual gate electrode and a voltage of the third node N3 connected to the second dual gate electrode. The light emitting diode may emit light with a brightness according to the adjusted driving current.

According to the example embodiment of the present disclosure, in the non-emission period (for example, the first period P1 to third period P3), an electric field and a charge concentration in the channel due to the dual gate voltage may be maintained to be high. Therefore, the OBS effect may be demonstrated and furthermore, a separate OB period is omitted to maximize the emission period.

Further, according to the example embodiment of the present disclosure, in the non-emission period, the anode electrode of the light emitting diode is continuously initialized to improve the black expression and the flickering characteristic in the VRR operation.

Further, according to the example embodiment of the present disclosure, the sensing period and the writing period are separated to ensure the compensation time of the threshold voltage and improve a compensation ability in the high resolution and high speed operation (for example, 120 Hz or higher).

Further, according to the example embodiment of the present disclosure, the capacitor-coupling by the first capacitor C1 and the second capacitor C2 which are source-follower type does not occur. Therefore, there is no design restriction on the capacitor capacity so that the design is allowed with a relatively small capacitor and the current reduction due to the capacitor coupling in the current drive type does not occur.

Further, according to the example embodiment of the present disclosure, the internal compensation is performed also in a negative threshold voltage area (a negatively shifted threshold voltage) of the oxide driving transistor.

Further, according to the example embodiment of the present disclosure, the number of GIPs is reduced up to two scan lines and one EM line.

The example embodiments of the present disclosure can also be described as follows:

According to an aspect of the present disclosure, there is provided a pixel circuit. The pixel circuit includes a first transistor including a 1-1-th electrode connected to a first node, a 1-2-th electrode connected to a second node, a 1-1-th dual gate electrode connected to a third node, and a 1-2-th dual gate electrode connected to a fourth node. The pixel circuit further includes a light emitting diode which includes an anode electrode connected to the second node and a cathode electrode which receives a low potential driving voltage, and emits light according to a driving current transmitted from the first transistor in an emission period. The pixel circuit further includes a first capacitor connected between the second node and the third node. The pixel circuit further includes a compensation circuit which is connected to the first transistor to sample a threshold voltage of the first transistor to generate the driving current in which the threshold voltage is compensated, in a sensing period before the emission period. The compensation circuit includes a second capacitor connected between the second node and the fourth node. The compensation circuit further includes a second transistor including a 2-1-th electrode connected to the fourth node. The compensation circuit further includes a 2-2-th electrode connected to the first node. The compensation circuit further includes a gate electrode which receives a first scan signal. And the compensation circuit further includes a third transistor including a 3-1-th electrode which receives a high potential driving voltage, a 3-2-th electrode connected to the fourth node, and a gate electrode which receives a second scan signal.

In the sensing period, the second transistor may be turned on in response to the first scan signal, and diode connection may be formed between the 1-1-th electrode of the first transistor and the second dual gate electrode.

The pixel circuit may further include a fourth transistor including a 4-1-th electrode which receives an initialization voltage, a 4-2-th electrode connected to the second node, and a gate electrode which receives an inverse EM signal.

In an initialization period before the sensing period, the third transistor and the fourth transistor may be turned on in response to the second scan signal and the inverse EM signal, the high potential driving voltage may be transmitted to the fourth node, and the initialization voltage may be transmitted to the second node.

The pixel circuit may further include a fifth transistor including a 5-1-th electrode which receives a reference voltage, a 5-2-th electrode connected to the third node, a 2-1-th dual gate electrode which receives the first scan signal, and a 2-2-th dual gate electrode which receives the second scan signal.

In an initialization period before the sensing period, the fifth transistor may be turned on in response to the first scan signal and the reference voltage may be transmitted to the third node.

In the sensing period, the fifth transistor may be turned on in response to the second scan signal and the reference voltage may be transmitted to the third node.

The pixel circuit may further include a sixth transistor including a 6-1-th electrode which receives a data voltage, a 6-2-th electrode connected to the third node, and a gate electrode which receives a third scan signal.

In a writing period after the sensing period and before the emission period, the sixth transistor may be turned on in response to the third scan signal and the data voltage may be transmitted to the third node.

The pixel circuit may further include a seventh transistor including a 7-1-th electrode which receives the high potential voltage, a 7-2-th electrode connected to the first node, and a gate electrode which receives an EM signal.

In the emission period, the seventh transistor may be turned on in response to the EM signal, the high potential driving voltage may be transmitted to the first node, and the light emitting diode may emit light according to a driving current transmitted from the first transistor.

According to another aspect of the present disclosure, a display device includes a gate driver which supplies a first scan signal, a second scan signal, a third scan signal, and an EM signal to gate lines. The display device further includes a power supply unit which generates and outputs a high potential driving voltage, a low potential driving voltage, a reference voltage, and an initialization voltage to power lines. The display device further includes a plurality of pixels which is disposed along a matrix shape defined by intersecting the data lines and the gate lines. Each of the plurality of pixels includes a first transistor including a 1-1-th electrode connected to a first node, a 1-2-th electrode connected to a second node, a 1-1-th dual gate electrode connected to a third node, and a 1-2-th dual gate electrode connected to a fourth node. The plurality of pixels further includes a light emitting diode which includes an anode electrode connected to the second node and a cathode electrode which receives a low potential driving voltage, and emits light according to a driving current transmitted from the first transistor in an emission period. The plurality of pixels further includes a first capacitor connected between the second node and the third node. And the plurality of pixels further includes a compensation circuit which is connected to the first transistor to sample a threshold voltage of the first transistor to generate the driving current in which the threshold voltage is compensated, in a sensing period before the emission period. The compensation circuit includes a second capacitor connected between the second node and the fourth node. The compensation circuit further includes a second transistor including a 2-1-th electrode connected to the fourth node, a 2-2-th electrode connected to the first node, and a gate electrode which receives a first scan signal. And the compensation circuit further includes a third transistor including a 3-1-th electrode which receives a high potential driving voltage, a 3-2-th electrode connected to the fourth node, and a gate electrode which receives a second scan signal.

In the sensing period, the second transistor may be turned on in response to the first scan signal, and diode connection may be formed between the 1-1-th electrode of the first transistor and the second dual gate electrode.

The display device may further include a fourth transistor including a 4-1-th electrode which receives an initialization voltage, a 4-2-th electrode connected to the second node, and a gate electrode which receives an inverse EM signal.

In an initialization period before the sensing period, the third transistor and the fourth transistor may be turned on in response to the second scan signal and the inverse EM signal, the high potential driving voltage may be transmitted to the fourth node, and the initialization voltage may be transmitted to the second node.

The display device may further include a fifth transistor including a 5-1-th electrode which receives a reference voltage, a 5-2-th electrode connected to the third node, a 2-1-th dual gate electrode which receives the first scan signal, and a 2-2-th dual gate electrode which receives the second scan signal.

In an initialization period before the sensing period, the fifth transistor may be turned on in response to the first scan signal and the reference voltage may be transmitted to the third node.

In the sensing period, the fifth transistor may be turned on in response to the second scan signal and the reference voltage may be transmitted to the third node.

The display device may further include a sixth transistor including a 6-1-th electrode which receives a data voltage, a 6-2-th electrode connected to the third node, and a gate electrode which receives a third scan signal.

In a writing period after the sensing period and before the emission period, the sixth transistor may be turned on in response to the third scan signal and the data voltage may be transmitted to the third node.

Although the example embodiments of the present disclosure have been described in detail with reference to the accompanying drawings, the present disclosure is not limited thereto and may be embodied in many different forms without departing from the technical concept of the present disclosure. Therefore, the example embodiments of the present disclosure are provided for illustrative purposes only but not intended to limit the technical concept of the present disclosure. The scope of the technical concept of the present disclosure is not limited thereto. Therefore, it should be understood that the above-described example embodiments are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A pixel circuit, comprising:

a first transistor including a 1-1-th electrode connected to a first node, a 1-2-th electrode connected to a second node, a 1-1-th dual gate electrode connected to a third node, and a 1-2-th dual gate electrode connected to a fourth node;

a light emitting diode including an anode electrode connected to the second node and a cathode electrode for receiving a low potential driving voltage, and emitting light according to a driving current transmitted from the first transistor in an emission period;

a first capacitor connected between the second node and the third node; and a compensation circuit which is connected to the first transistor to sample a threshold voltage of the first transistor to generate the driving current in which the threshold voltage is compensated, in a sensing period before the emission period, wherein the compensation circuit includes:

a second capacitor connected between the second node and the fourth node;

a second transistor including a 2-1-th electrode connected to the fourth node, a 2-2-th electrode connected to the first node, and a gate electrode which is configured to receive a first scan signal; and a third transistor including a 3-1-th electrode which is configured to receive a high potential driving voltage, a 3-2-th electrode connected to the fourth node, and a gate electrode which is configured to receive a second scan signal.

2. The pixel circuit according to claim 1, wherein in the sensing period, the second transistor is for being turned on in response to the first scan signal, and diode connection is formed between the 1-1-th electrode of the first transistor and the 1-2-th dual gate electrode.

3. The pixel circuit according to claim 1, further comprising:

a fourth transistor including a 4-1-th electrode which is configured to receive an initialization voltage, a 4-2-th electrode connected to the second node, and a gate electrode which is configured to receive an inverse emission control (EM) signal.

4. The pixel circuit according to claim 3, wherein in an initialization period before the sensing period, the third transistor and the fourth transistor are for being turned on in response to the second scan signal and the inverse EM signal, the high potential driving voltage is for being transmitted to the fourth node, and the initialization voltage is for being transmitted to the second node.

5. The pixel circuit according to claim 1, further comprising:

a fifth transistor including a 5-1-th electrode which is configured to receive a reference voltage, a 5-2-th electrode connected to the third node, a 2-1-th dual gate electrode which is configured to receive the first scan signal, and a 2-2-th dual gate electrode which is configured to receive the second scan signal.

6. The pixel circuit according to claim 5, wherein in an initialization period before the sensing period, the fifth transistor is for being turned on in response to the first scan signal and the reference voltage is for being transmitted to the third node.

7. The pixel circuit according to claim 6, wherein in the sensing period, the fifth transistor is for being turned on in response to the second scan signal and the reference voltage is for being transmitted to the third node.

8. The pixel circuit according to claim 5, further comprising:

a sixth transistor including a 6-1-th electrode which is configured to receive a data voltage, a 6-2-th electrode connected to the third node, and a gate electrode which is configured to receive a third scan signal.

9. The pixel circuit according to claim 8, wherein in a writing period after the sensing period and before the emission period, the sixth transistor is for being turned on in response to the third scan signal and the data voltage is for being transmitted to the third node.

10. The pixel circuit according to claim 1, further comprising:

a seventh transistor including a 7-1-th electrode which is configured to receive the high potential driving voltage, a 7-2-th electrode connected to the first node, and a gate electrode which is configured to receive an EM signal.

11. The pixel circuit according to claim 10, wherein in the emission period, the seventh transistor is for being turned on in response to the EM signal, the high potential driving voltage is for being transmitted to the first node, and the light emitting diode is configured to emit light according to a driving current transmitted from the first transistor.

12. A display device, comprising:

a gate driver for supplying a first scan signal, a second scan signal, a third scan signal, and an emission control (EM) signal to gate lines;

a power supply unit for generating and outputting a high potential driving voltage, a low potential driving voltage, a reference voltage, and an initialization voltage to power lines; and a plurality of pixels disposed along a matrix shape defined by intersecting data lines and the gate lines, wherein each of the plurality of pixels includes:

a first transistor including a 1-1-th electrode connected to a first node, a 1-2-th electrode connected to a second node, a 1-1-th dual gate electrode connected to a third node, and a 1-2-th dual gate electrode connected to a fourth node;

a light emitting diode including an anode electrode connected to the second node and a cathode electrode for receiving the low potential driving voltage, and emitting light according to a driving current transmitted from the first transistor in an emission period;

a first capacitor connected between the second node and the third node; and a compensation circuit which is connected to the first transistor to sample a threshold voltage of the first transistor to generate the driving current in which the threshold voltage is compensated, in a sensing period before the emission period, and wherein the compensation circuit includes:

a second capacitor connected between the second node and the fourth node;

a second transistor including a 2-1-th electrode connected to the fourth node, a 2-2-th electrode connected to the first node, and a gate electrode which is configured to receive the first scan signal; and a third transistor including a 3-1-th electrode which is configured to receive the high potential driving voltage, a 3-2-th electrode connected to the fourth node, and a gate electrode which is configured to receive the second scan signal.

13. The display device according to claim 12, wherein in the sensing period, the second transistor is for being turned on in response to the first scan signal, and diode connection is formed between the 1-1-th electrode of the first transistor and the 1-2-th dual gate electrode.

14. The display device according to claim 12, further comprising:

a fourth transistor including a 4-1-th electrode which is configured to receive the initialization voltage, a 4-2-th electrode connected to the second node, and a gate electrode which is configured to receive an inverse EM signal.

15. The display device according to claim 14, wherein in an initialization period before the sensing period, the third transistor and the fourth transistor are for being turned on in response to the second scan signal and the inverse EM signal, the high potential driving voltage is for being transmitted to the fourth node, and the initialization voltage is for being transmitted to the second node.

16. The display device according to claim 12, further comprising:

a fifth transistor including a 5-1-th electrode which is configured to receive the reference voltage, a 5-2-th electrode connected to the third node, a 2-1-th dual gate electrode which is configured to receive the first scan signal, and a 2-2-th dual gate electrode which is configured to receive the second scan signal.

17. The display device according to claim 16, wherein in an initialization period before the sensing period, the fifth transistor is for being turned on in response to the first scan signal and the reference voltage is for being transmitted to the third node.

18. The display device according to claim 17, wherein in the sensing period, the fifth transistor is for being turned on in response to the second scan signal and the reference voltage is for being transmitted to the third node.

19. The display device according to claim 16, further comprising:

a sixth transistor including a 6-1-th electrode which is configured to receive a data voltage, a 6-2-th electrode connected to the third node, and a gate electrode which is configured to receive the third scan signal.

20. The display device according to claim 19, wherein in a writing period after the sensing period and before the emission period, the sixth transistor is for being turned on in response to the third scan signal and the data voltage is for being transmitted to the third node.

* * * * *